United States Patent
Nemoto (10) Patent No.: US 10,415,543 B2
(45) Date of Patent: Sep. 17, 2019

(54) BLADE AND STRUT OF WIND TURBINE FOR VERTICAL-AXIS WIND POWER GENERATOR

(71) Applicant: Yutaka Nemoto, Fukuoka (JP)

(72) Inventor: Yutaka Nemoto, Fukuoka (JP)

( * ) Notice: Subject to any disclaimer, the term of this patent is extended or adjusted under 35 U.S.C. 154(b) by 253 days.

(21) Appl. No.: 15/278,310

(22) Filed: Sep. 28, 2016

(65) Prior Publication Data

US 2017/0016427 A1 Jan. 19, 2017

Related U.S. Application Data

(63) Continuation of application No. PCT/JP2015/059720, filed on Mar. 27, 2015.

(30) Foreign Application Priority Data

Apr. 4, 2014 (JP) .................................. 2014-077555
Jul. 25, 2014 (JP) .................................. 2014-152405

(51) Int. Cl.
*F03D 3/06* (2006.01)

(52) U.S. Cl.
CPC ............. *F03D 3/061* (2013.01); *F03D 3/062* (2013.01); *F03D 3/068* (2013.01);
(Continued)

(58) Field of Classification Search
CPC .......... F03D 3/061; F03D 3/068; F03D 3/062; F05B 2220/706; F05B 2240/214
See application file for complete search history.

(56) References Cited

U.S. PATENT DOCUMENTS 8,550,786 B2 * 10/2013 Janiuk ..................... F03D 3/061
 415/4.2
9,404,474 B2 * 8/2016 Watanabe ............... F03D 3/005
(Continued)

FOREIGN PATENT DOCUMENTS

JP 2005-307850 A 11/2005
JP 2006-46306 A 2/2006
(Continued)

OTHER PUBLICATIONS

OA for Japanese patent application No. 2014-152405, dated Oct. 31, 2014, total of 6 pages.
(Continued)

*Primary Examiner* — Eldon T Brockman
(74) *Attorney, Agent, or Firm* — Lynette Wylie; Apex Juris, pllc.

(57) ABSTRACT

A wind turbine for a wind power generator includes: a center shaft arranged in a vertical direction; a plurality of horizontal arms attached in a radial manner to the center shaft; and a plurality of blades each arranged on an outer end of each of the plurality of horizontal arms so as to stand in an upright position, the plurality of blades each having a streamlined shape, in horizontal cross-section, including a 45±10% front side and a rear side, of which the rear side defines a convex arc-shaped outer-side surface and a concave arc-shaped center-shaft-side surface in a continuously closed manner, and a blade thickness across the convex arc-shaped outer-side surface and the concave arc-shaped center-shaft-side surface decreases gradually from a full dimension, in a region from a center-shaft-side point of inflection in blade thickness to a rear end of each of the plurality of blades.

8 Claims, 6 Drawing Sheets

(52) U.S. Cl.
CPC ... *F05B 2220/706* (2013.01); *F05B 2240/214* (2013.01); *Y02E 10/74* (2013.01)

(56) References Cited

U.S. PATENT DOCUMENTS

| | | | |
|---|---|---|---|
| 2007/0177970 A1* | 8/2007 | Yokoi | F03D 3/005 415/4.2 |
| 2007/0224029 A1* | 9/2007 | Yokoi | F03D 3/005 415/4.2 |
| 2008/0273978 A1* | 11/2008 | Watkins | F03D 3/061 416/197 A |
| 2009/0167030 A1* | 7/2009 | Watkins | F03D 3/061 290/55 |
| 2010/0021300 A1 | 1/2010 | Noguchi | |
| 2011/0133474 A1 | 6/2011 | Haar | |
| 2011/0142659 A1* | 6/2011 | Janiuk | F03D 3/061 416/223 R |
| 2013/0036601 A1 | 2/2013 | Blanc | |
| 2015/0118050 A1* | 4/2015 | Joosten | F03D 3/005 416/117 |

FOREIGN PATENT DOCUMENTS

| | | |
|---|---|---|
| JP | 2007-270746 A | 10/2007 |
| JP | 2008-101536 A | 5/2008 |
| JP | 2010/249062 A | 11/2010 |
| JP | 5251458 B2 | 7/2013 |
| WO | WO2005-095793 A | 10/2005 |
| WO | WO2005-116446 A1 | 12/2005 |
| WO | WO2011/091519 A1 | 8/2011 |

OTHER PUBLICATIONS

OA for Japanese patent application No. 2014-152405, dated Mar. 5, 2015, total of 6 pages.
OA for Korean patent application No. 10-2016-7027379, dated Jun. 21, 2017, total of 7 pages.
First OA for Australian patent application No. 2015239310, dated Aug. 17, 2017, total of 7 pages.
Second OA for Australian patent application No. 2015239310, dated Aug. 6, 2018, total of 7 pages.
Philippine Substantive Examination Report, in counterpart Philippine Patent Application No. 1/2016/501892, dated Jan. 11, 2018, total of 5 pages.

* cited by examiner

BLADE AND STRUT OF WIND TURBINE FOR VERTICAL-AXIS WIND POWER GENERATOR

CROSS REFERENCE TO RELATED APPLICATIONS

This is a continuation application of International Patent Application No. PCT/JP2015/059720 filed on Mar. 27, 2015 claiming priority upon Japanese Patent Application Nos. 2014-077555 and 2014-152405 filed on Apr. 4, 2014 and Jul. 25, 2014, respectively, of which full contents are incorporated herein by reference.

BACKGROUND OF THE INVENTION

Field of the Invention

The present invention relates to a shape of blades and struts of a wind turbine for a vertical-axis wind power generator.

Description of the Background Art

As described on page 74 of "Book On Wind Power Generation" authored by Izumi Ushiyama, a wind turbine does not rotate under a wind speed of approximately 2 m/s or lower unless the width of blades is set to be larger, for example. A wind speed at which a wind turbine starts rotating is called the starting speed or the start speed, and a wind speed at which the wind turbine starts generating power is called the cut-in speed. Due to the destruction of the Fukushima nuclear power station caused by the Tohoku earthquake disaster, the safety of the nuclear power generation has decreased, and it has been desirable to improve the efficiency of a power generator using renewable energy.

Examples of vertical-axis wind turbines are disclosed in Patent Document 1 and the like. The Document discloses a Savonius wind turbine having a simple structure capable of generating high torque at a low rotation speed without sacrificing the advantageous features of the Savonius wind turbine. According to this Savonius wind turbine, the blades have such a structure that each of the blades is curved stepwise in an inverted Z-shape or a Z-shape at a position closer to an outer end of the blade so that a portion closer to the outer end of the blade is relatively shifted toward a concave curved surface receiving wind. According to such a structure, the wind power received by an outer surface of a step plate assists the wind power received by the concave curved surface. As a result, the wind turbine generates high torque at a low rotation speed.

PRIOR ART DOCUMENTS

Patent Documents

Patent Document 1: Japanese Patent No. 5251458

Problems to be Solved

In this Savonius wind turbine, however, one of the two curved blade plates has received force in a reverse direction in relation to a direction of wind, and for this reason, such drag has inevitably reduced the torque or the output power.

SUMMARY OF THE INVENTION

In view of the above problems, a technical objective of the present invention is to provide a blade having such a shape that the blade effectively operates in a rotation direction by reducing the force acting in a reverse direction from the rotation direction.

The shape (i.e. the external dimension) of a blade, as the most important portion of a wind turbine for a vertical-axis wind power generator, is different depending upon the output power of the wind power generator; however, the technical objective of the present invention is to focus on the back side (i.e. the back) of the blade unnoticed generally so as to provide a blade having such a shape that can capture a weak breeze.

Means for Solving Problems

For solving the above-described problems, there is provided, as a first aspect of the invention, a wind turbine for a wind power generator comprising: a center shaft arranged in a vertical direction; a plurality of horizontal arms attached in a radial manner to the center shaft; and a plurality of blades each arranged on an outer end of each of the plurality of horizontal arms so as to stand in an upright position, the plurality of blades each having a streamlined shape, in horizontal cross-section, including a 45±10% front side and a rear side, of which the rear side defines a convex arc-shaped outer-side surface and a concave arc-shaped center-shaft-side surface in a continuously closed manner, and a blade thickness across the convex arc-shaped outer-side surface and the concave arc-shaped center-shaft-side surface decreases gradually from a full dimension, in a region from a center-shaft-side point of inflection in blade thickness to a rear end of each of the plurality of blades.

Further, there is provided, as a second aspect of the invention, the wind turbine for the wind power generator as the first aspect of the invention described above, wherein the concave arc-shaped surface has a depressed region located closer to the outer-side surface than a level of a virtual straight line passing virtually through a front end of the streamlined shape and the rear end.

Still further, there is provided, as a third aspect of the invention, the wind turbine for the wind power generator as the first or second aspect of the invention described above, wherein each of the plurality of blades has: a surface attached with a thin plate in order to reduce a weight; a hollow structure formed therein in order to further reduce the weight; and a spacer member provided therewith for reinforcement.

Still further, there is provided, as a fourth aspect of the invention, the wind turbine for the wind power generator as the first, second, or third aspect of the invention described above, wherein a plurality of wings each arranged on an outer side with respect to the center-shaft-side point of inflection in blade thickness in such a manner that each of the plurality of wings is openable and closable through a hinge mechanism, or is fixed in an open state.

Still further, there is provided, as a fifth aspect of the invention, the wind turbine for the wind power generator as any one of the first, second, third, or fourth aspect of the invention described above, wherein each of the plurality of horizontal arms having a shape in vertical cross-section located closer at least to an outer end thereof has: a reinforcement member interposed in a hollow portion of a hollow streamlined shape; an upper surface in convex arc-shape, as a portion of the streamlined shape, at a rear of 60±10% distance from a forehead thereof; and a rearward opening maintained as a result of removing a lower surface.

Still further, there is provided, as a sixth aspect of the invention, the wind turbine for the wind power generator as the fifth aspect of the invention described above, wherein a plurality of fixed wings each is attached to the lower surface in an open state.

Advantageous Effects of the Invention

According to the first aspect of the invention described above, a plurality of blades are arranged on outer ends of a plurality of horizontal arms attached in a radial manner to a center shaft arranged in a vertical direction in such a manner that each of the plurality of blades stands in an upright position. Each blade has a streamlined shape, in horizontal cross-section, and such a shape includes a 45±10% front side and a rear side, where the rear side of the blade defines a convex arc-shaped outer-side surface and a concave arc-shaped center-shaft-side surface in a continuously closed manner, and where a thickness of the blade across the convex arc-shaped outer-side surface and the concave arc-shaped center-shaft-side surface decreases gradually from a full dimension from a center-shaft-side point of inflection in blade thickness to a rear end. As a result, each of the plurality of blades receives wind effectively on the back thereof so that the plurality of blades can be pushed by the wind. Further, each of the plurality of blades gradually receives wind power on the lateral side thereof when the wind turbine rotates by being pushed by the wind power on the back thereof. Nevertheless, the other blades are pushed in a forward direction by the wind power striking the concave arc-shaped surfaces on the back-side surfaces thereof, and therefore, the wind power acts as a force for causing the wind turbine to rotate.

According to the second aspect of the invention described above, as illustrated in FIGS. 4 and 5, an inner surface of the concave arc-shaped surface located closer to the center-shaft-side point of inflection in blade thickness than an inner surface at the rear end is depressed closer to the outer-side surface than a virtual straight line virtually passing a front end of the streamlined shape and the rear end of the blade.

According to the third aspect of the invention described above, the surface of each of the plurality of blades is formed by attaching thereto a thin plate in order to reduce a weight and a hollow structure is formed therein in order to further reduce the weight, and a spacer member is provided therewith for reinforcement. As a result, the wind turbine is strong in spite of the fact that it is light in weight. Further, by virtue of such a light weight, the wind turbine starts rotating at a small wind power (0.8 m/s) and can generate power with a weak breeze.

According to the fourth aspect of the invention described above, a plurality of wings each arranged on an outer side with respect to the center-shaft-side point of inflection in blade thickness may be operable and closable through a hinge mechanism, or may be fixed in an open state. When the wing is open, a wind pressure reflected from a concave curved surface is added and the resultant wind pressure is received on a larger surface so that the wind pressure can be utilized more effectively. It is possible, therefore, to generate electric power even when the wind is weak.

According to the fifth aspect of the invention described above, each of the plurality of horizontal arms having a shape in vertical cross-section located closer at least to an outer end thereof has: a reinforcement member interposed in a hollow portion of a hollow streamlined shape; an upper surface in convex arc-shape, as a portion of the streamlined shape, at a rear of 60±10% distance from a forehead thereof; and a rearward opening maintained as a result of removing a lower surface. As a result, the strut (each of the plurality of horizontal arms) also receives wind effectively on the back thereof so that a force of pushing the plurality of blade as a whole by the wind can be improved.

According to the sixth aspect of the invention described above, a short fixed wing is attached to the lower surface in an open state so that the wind pressure pushing the strut (each of the plurality of horizontal arms) can be improved, and the rotation of the wind turbine becomes higher in speed and larger in torque.

In view of the above, a small torque acts in a direction of causing the wind turbine to rotate in a reverse direction while a large torque acts in a direction of causing the wind turbine to rotate in a forward direction. Further, not only the plurality of blades but also the struts (the plurality of horizontal arms) serve as blades. As a result, the wind turbine can generate electric power by receiving a weak wind power.

BRIEF DESCRIPTION OF THE DRAWINGS

For more thorough understanding of the present invention and advantages thereof, the following descriptions should be read in conjunction with the accompanying drawings in which.

DESCRIPTION OF EMBODIMENTS OF THE INVENTION

Hereinafter, a wind turbine for a wind power generator as an embodiment according to the present invention will be described with reference to the drawings.

Figure 1:
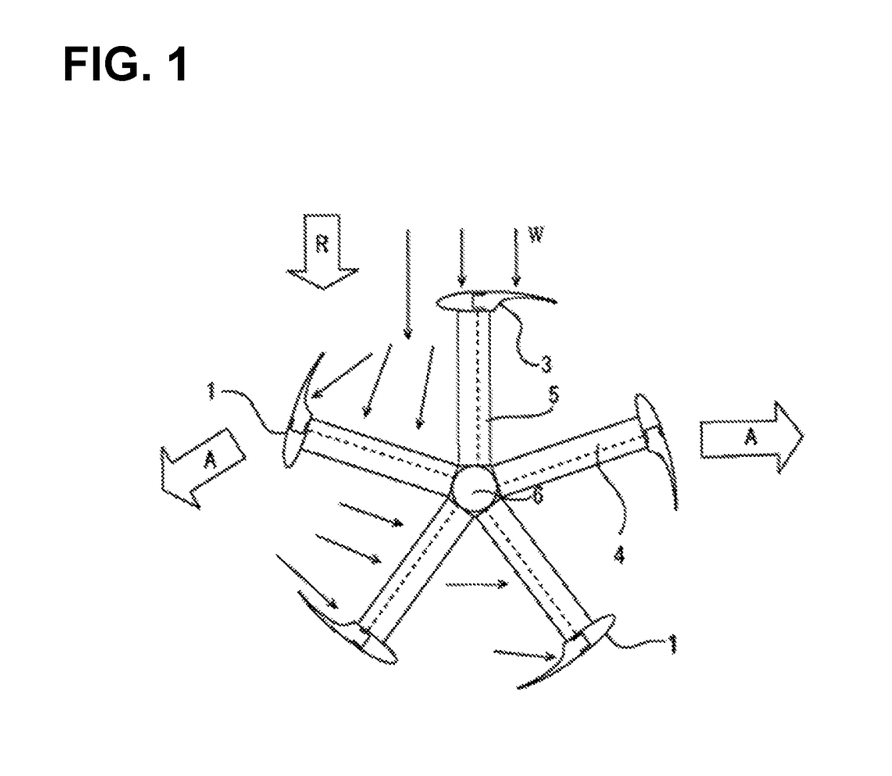
FIG. 1 depicts a plan view of a wind turbine as an embodiment according to the present invention.

A conventional wind turbine (blade) for a wind power generator rotates through the use of any one of drag or lift. As illustrated in FIG. 1, however, a wind turbine (blade) for a vertical-axis wind power generator as an embodiment according to the present invention is characterized in that the wind turbine (blade) uses the force (the force of drag) striking an operation button in a travelling direction of an airflow received by a surface 2 of a blade 1 as well as the vertical force (the force of lift) resulting from a vertical pressure difference occurring therefrom. That is, a concave curved surface 3 smaller in radius than a convex curved surface of the surface 2 is formed on the inner side (i.e. the side closer to the center of rotation of the blade 1).

Figure 2:
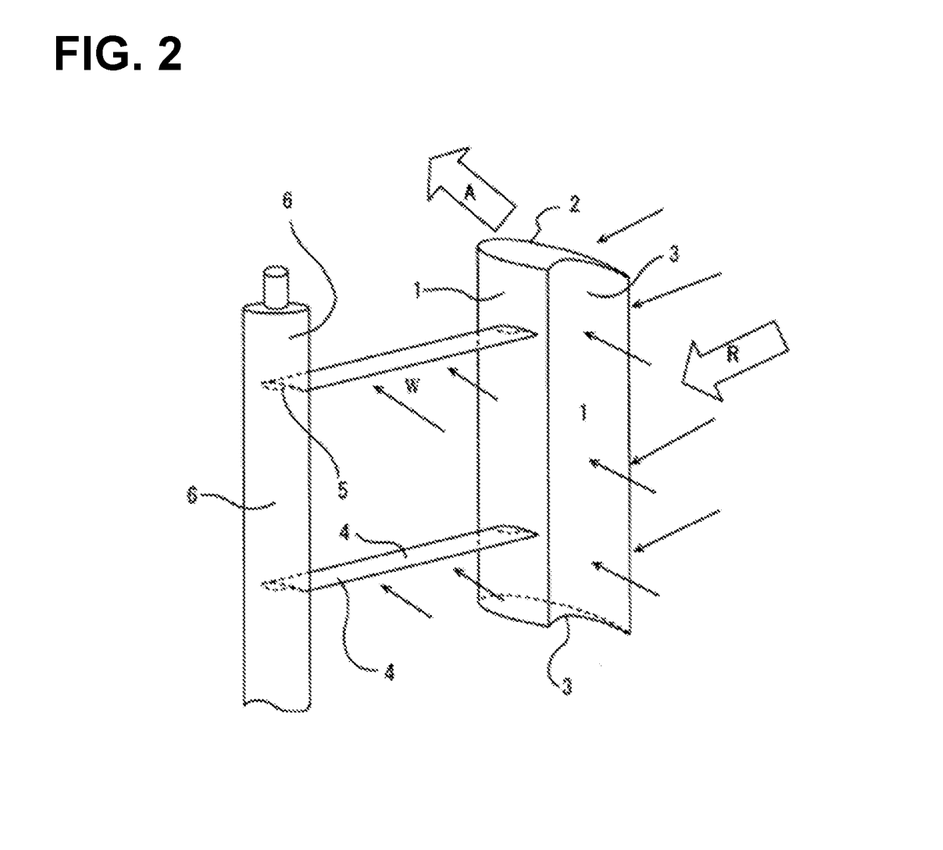
FIG. 2 depicts an enlarged perspective view of a portion of the wind turbine shown in FIG. 1.
Figure 3:
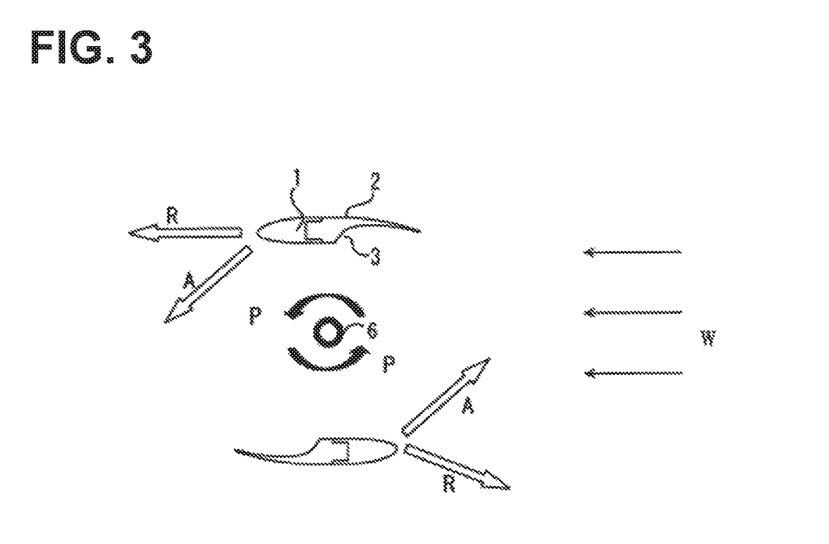
FIG. 3 depicts a plan view showing the wind power received by and the electric power output from the wind turbine shown in FIG. 1.

According to one of the characteristics of an embodiment, a method allowing the drag R and the lift A to be utilized simultaneously is realized by forming the lower sides of the blade and each of the struts 4 illustrated in FIG. 2 so as to form a concave curved surface. In this way, a novel wind turbine (blade) for a vertical-axis wind power generator capable of generating a wind power twice stronger than a wind power generated by one blow of wind.

In this way, the wind turbine (blade) for a vertical-axis wind power generator as an embodiment according to the present invention generates drag R on the surface of the wind turbine (blade) to cause the wind turbine (blade) to rotate and generates lift A through the use of the concave curved surface 3 of the blade 1 and the bag-shaped concave curved portion 5 on the lower side of the strut 4 to obtain satisfactory power generation efficiency. That is, it is possible to generate a wind power twice stronger than a wind power generated by one blow of wind and to allow the wind turbine to start rotating with a weak breeze unlike the conventional wind power generator. Therefore, when strong wind with which power can be generated blows, it is possible to start power generation quickly and to obtain satisfactory power generation efficiency.

Figure 4:
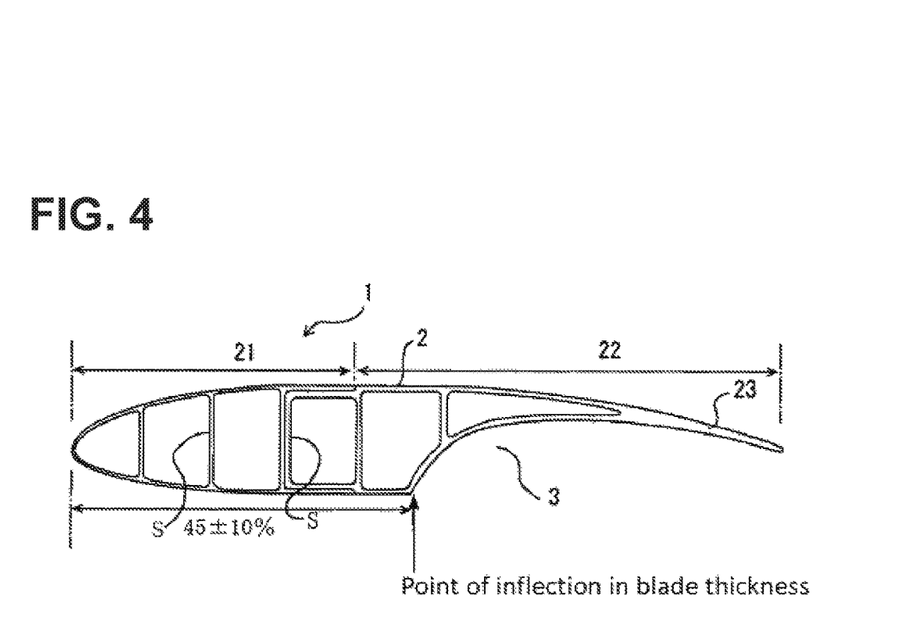
FIG. 4 depicts a horizontal cross-sectional view showing details of a blade.

Further specifically, according to one of the characteristics of the wind turbine (blade) for a vertical-axis wind power generator as an embodiment, the best position at which the concave curved surface 3 starts being formed on the inner side of the blade 1 is located at a position corresponding to 45% from a forehead portion 21 as illustrated in FIG. 4. A tail portion in which the concave curved surface 3 is formed has a length approximately three times the full thickness of the blade and is a thin wall as illustrated in FIG. 2 when seen from the front.

Figure 5:
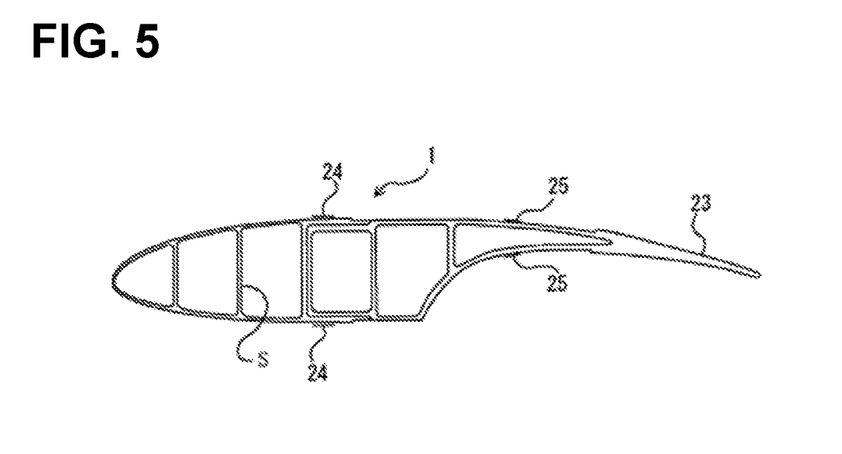
FIG. 5 depicts a horizontal cross-sectional view showing a connection portion of the blade.

Further, according to one of the characteristics of the wind turbine (blade) for a vertical-axis wind power generator as an embodiment, the wind turbine (blade) is manufactured by shaping the blade in a hollow pipe shape which is divided into two portions in a front-rear direction from an approximately central portion as illustrated in FIGS. 4 and 5 by a pressing or drawing method through the use of an aluminum alloy (AL-5025) which is light and strong.

The two front and rear blades (i.e. the forehead portion 21 and the rearward portion 22) shaped in a pipe shape by the pressing method are combined and assembled at the center as illustrated in FIG. 5 and are fixed by rivet screws, whereby the blades are integrated as one blade for the wind turbine as an embodiment according to the present invention.

Since the blade 1 assembled in one piece is heavy (although the weight is different depending on a model), however, a portion of the rearward portion 22 is uniformly bored to form a plurality of holes to reduce the weight. That is, a rearward thin portion 23 is gradually thinned to become solid.

As an operation of blocking the holes in the bored rearward portion 22, it is necessary to block the upper and lower surfaces thereof through the use of aluminum plates 24 and 25 having a thickness of 0.5 mm after the front and rear blades are combined and assembled. Due to this, the front and rear blades originally have steps formed therein.

Figure 6:
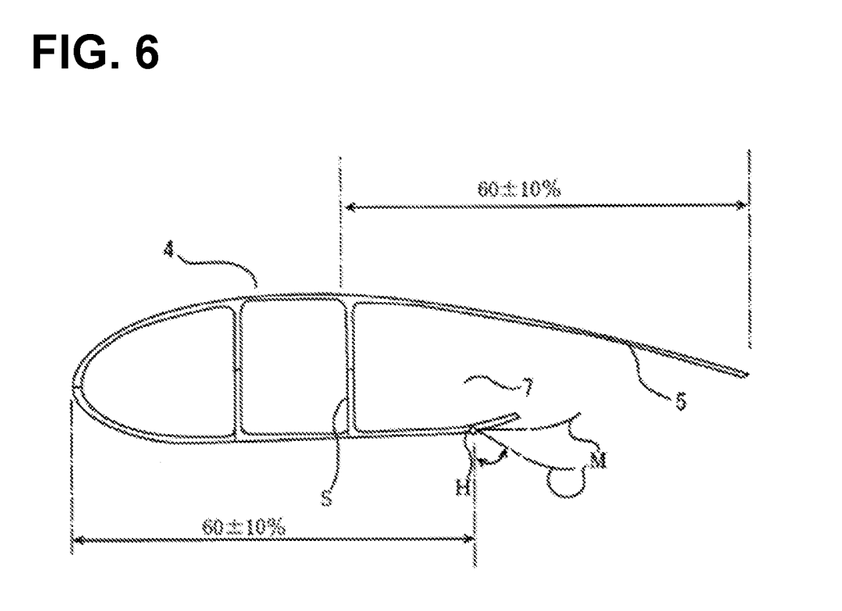
FIG. 6 depicts a vertical cross-sectional view showing details of a strut.

When the blade 1 is connected and fixed to a center shaft 6, the blade 1 is supported by being fixed by a horizontal arm 4 called a strut (beam). An embodiment according to the present invention focuses on the horizontal arm 4 which are generally unnoticed to form the horizontal arm 4 in a bag shape 7 that can receive the resistance of air more easily than the concave curved surface 3 on the inner side of the blade 1 as illustrated in FIG. 6. In this way, the airflow (i.e. wind) generated from the blade 1 caused to rotate with the wind received by the surface of the blade 1 due to drag R is received by the blade 1 rotating with the rotary motion of lift A and the strut (beam) 4 as an embodiment according to the present invention so that the wind turbine is pushed from the rear side. In this way, it is possible to obtain a rotary motion more efficiently. The larger the radius of rotation, the stronger the rotation resulting from the pressure that the bag shape 7 receives.

According to one of the characteristics of the strut (beam) for a vertical-axis wind power generator as an embodiment, since the strut (beam) 4 has a small area [width: 140×45] unlike the blade 1 [width: 360×65], a bag-shaped concave curved portion 5 of the strut (beam) 4 is open widely in a rearward portion and at a position corresponding to 60±10% of a forehead portion so that the strut (beam) 4 can easily receive wind efficiently.

The blade 1 and the strut 4 have a hollow structure in order to reduce the weight and a reinforcement member S is interposed therein to improve the strength. A surface plate exposed the outside air is manufactured by assembling or machining plates.

The concave curved surface 3 on the rear inner side of the blade 1, the first reinforcement member S, and the second reinforcement member S as necessary may be omitted to create the same bag shape as the strut 4.

Figure 7:
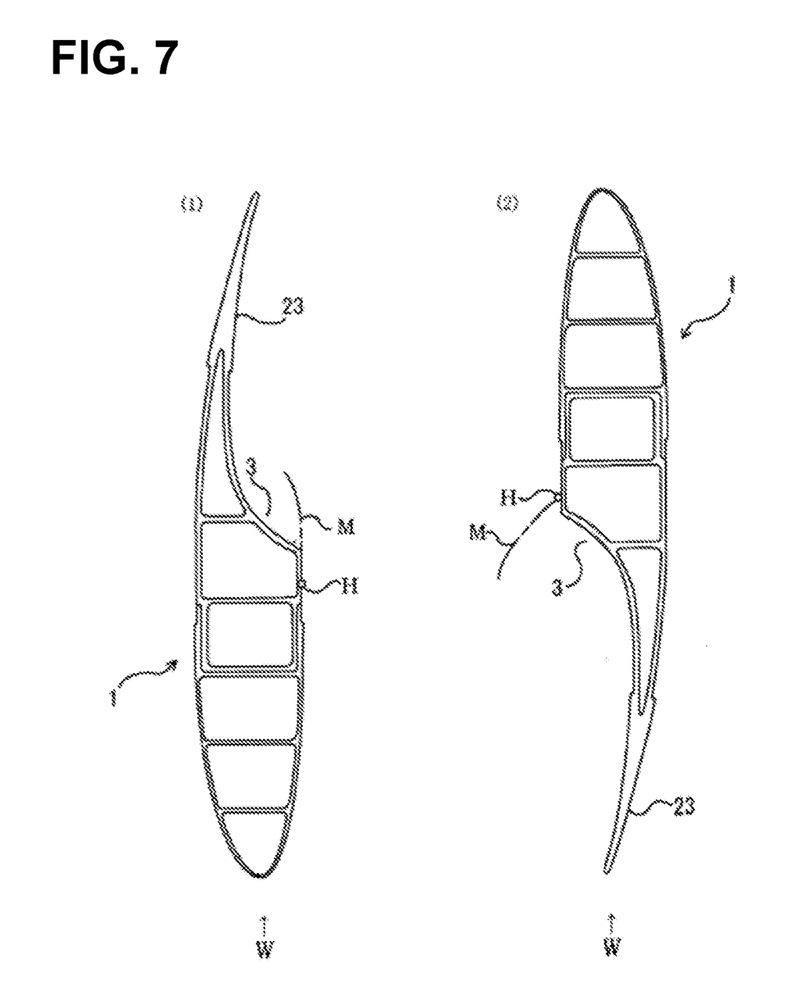
FIG. 7 depicts a horizontal cross-sectional view showing an opening/closing operation of an opening/closing wing.

An opening/closing wing M having an opening/closing structure as indicated by a chain line may be attached to the outer surface of the blade 1 and the strut 4. As illustrated in FIG. 7, the opening/closing wing M has a planar shape, and a front end thereof is attached to the outer surface at a blade-thickness-changing position of the blade 1 via a hinge H. As illustrated in (1) of FIG. 7, therefore, when the blade 1 rotates facing the wind W, the opening/closing wing M is closed by the wind pressure. However, as illustrated in (2) of FIG. 7, when the blade 1 rotates by 180° and the wind W pushes the concave curved surface 3 at the rear end thereof, the opening/closing wing M is open by being pushed by the wind pressure and the wind pressure is received by the large surface of the opening/closing wing M. It is possible, therefore, to utilize the wind pressure more effectively.

When the blade 1 rotates further and the wind pressure in a direction of closing the opening/closing wing M is received from the front end, the opening/closing wing M is closed and the force in the direction of pushing the blade 1 is minimized.

When the wind is reflected from the concave curved surface 3 of the blade to strike the opening/closing wing M, since the wind acts in the direction of pushing the blade 1 forward, the wind turbine rotates more smoothly. Moreover, since the wind reflected from the concave curved surface 3 is guided to the bag-shaped strut 4 as an embodiment according to the present invention in the position where the opening/closing wing M is not present, the wind contributes to the rotation of the wind turbine.

The opening/closing wing M attached to the lower surface of the strut 4 of FIG. 6 by the hinge H is open and closed as indicated by a chain line, and both the open state and the closed state are illustrated.

When the opening angle of the opening/closing wing M is set to approximately 30° or smaller, since the opening/closing wing serves as a resistance, it is necessary to provide a stopper so that the opening/closing wing M is not open further than that angle.

Figure 8:
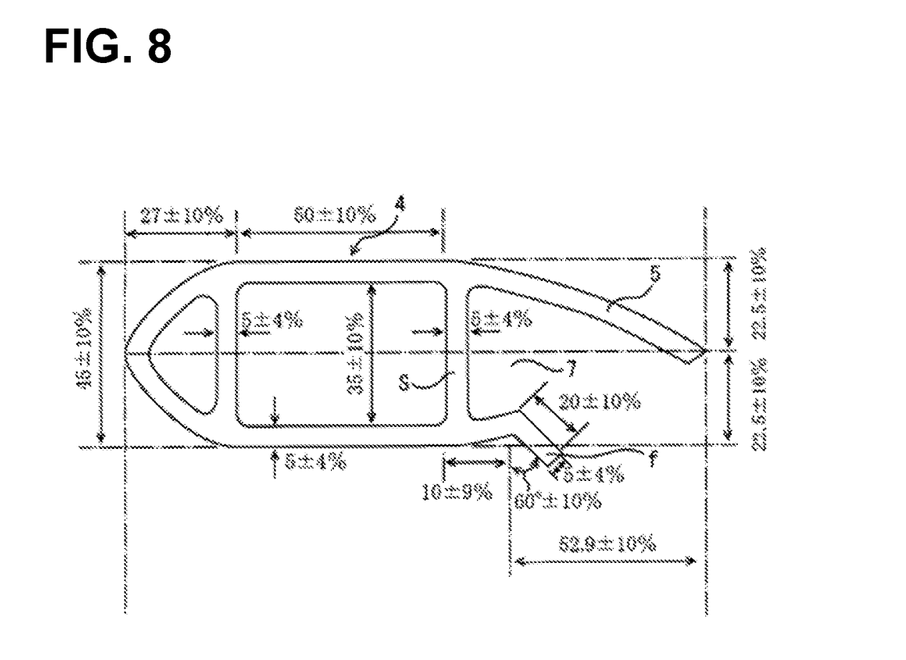
FIG. 8 depicts a vertical cross-sectional view of an embodiment having a strut provided with a fixed wing.

In the example of a strut illustrated in FIG. 8, a fixed wing f is integrally fixed thereto in an open state originally. That is, the opening/closing wing M illustrated in FIG. 6 is fixed in an open state. The dimensions are examples.

The opening/closing wing M of the blade 1 illustrated in FIG. 7 may be fixed in an open state rather than fixing the same using the hinge H.

INDUSTRIAL APPLICABILITY

As described above, in the wind turbine (blade) for a vertical-axis wind power generator, the outer surface at the outer end of the wind turbine (blade) has a convex arc shape, the inner surface thereof has a concave arc shape having a smaller radius than the outer surface, and the strut (beam) has a bag shape. The wind turbine (blade) can therefore rotate by capturing wind effectively and can generate power.

Although the shapes of blades and struts do not change greatly depending on a model, the external sizes are different depending on the model.

| (Reference Numerals) | | | |
|---|---|---|---|
| 1 | Blade | 2 | Surface |
| 3 | Concave curved surface | 4 | Strut (Horizontal arm) |
| 5 | Bag-shaped concave curved portion | 6 | Center shaft |
| 7 | Bag shape | 21 | Forehead portion |
| 22 | Rearward portion | 23 | Rearward thin portion |
| 24, 25 | Aluminum plate | | |
| M | Opening/closing wing | H | Hinge |
| F | Fixed wing | R | Drag |
| A | Lift | W | Wind |
| P | Rotating force | S | Reinforcement member |

What is claimed is:

1. A wind turbine for a wind power generator comprising:
a center shaft arranged in a vertical direction;
a plurality of horizontal arms attached in a radial manner to the center shaft;
a plurality of blades each arranged on outer ends of the plurality of horizontal arms so as to stand in an upright position, the plurality of blades each having a first streamlined shape, in horizontal cross-section, including a front side having a 45%±10% length of a total straight length and a rear side, of which
the rear side defines a convex arc-shaped surface at an outer side and a concave arc-shaped surface at a center-shaft side in a continuously closed manner, and
a blade thickness between the convex arc-shaped surface and the concave arc-shaped surface decreases gradually, from a full dimension, from a point of inflection in blade thickness at the center-shaft side to a rear end of each of the plurality of blades; and
a plurality of wings each arranged around the point of inflection in blade thickness at the center-shaft side so as to be openable and closable through a hinge mechanism, or is fixed in an open state, in a rearward direction; and
the plurality of horizontal arms each having a second streamlined shape in vertical cross-section at a location closer at least to the outer end thereof than to the center shaft; each having a reinforcement member interposed within a hollow portion of the second streamlined shape; and each having an upper surface of a convex arc-shape as a portion of the second streamlined shape and having a lower surface formed with a rearward opening in a rearward direction from a forehead thereof having a 60%±10% length of a total straight length of the second streamlined shape.

2. The wind turbine for the wind power generator according to claim 1, wherein
the concave arc-shaped surface has a depressed region located closer to a level of the convex arc-shaped surface at the outer side than to a level of a virtual straight line passing virtually through a front end of the first streamlined shape and the rear end of each of the plurality of blades.

3. The wind turbine for the wind power generator according to claim 2, wherein
each of the plurality of blades has: a surface attached with a thin plate in order to reduce a weight; a hollow structure formed therein in order to further reduce the weight; and a spacer member provided therewith for reinforcement.

4. The wind turbine for the wind power generator according to claim 3, wherein a plurality of fixed wings each is attached to the lower surface around the rearward opening in an open state.

5. The wind turbine for the wind power generator according to claim 2, wherein a plurality of fixed wings each is attached to the lower surface around the rearward opening in an open state.

6. The wind turbine for the wind power generator according to claim 1, wherein
each of the plurality of blades has: a surface attached with a thin plate in order to reduce a weight; a hollow structure formed therein in order to further reduce the weight; and a spacer member provided therewith for reinforcement.

7. The wind turbine for the wind power generator according to claim 6, wherein a plurality of fixed wings each is attached to the lower surface around the rearward opening in an open state.

8. The wind turbine for the wind power generator according to claim 1, wherein a plurality of fixed wings each is attached to the lower surface around the rearward opening in an open state.

* * * * *